W. M. BOWLES.
OIL STORAGE TANK.
APPLICATION FILED NOV. 21, 1916.

1,264,149.

Patented Apr. 30, 1918.
3 SHEETS—SHEET 1.

Inventor
W. M. Bowles.

By
Attorneys

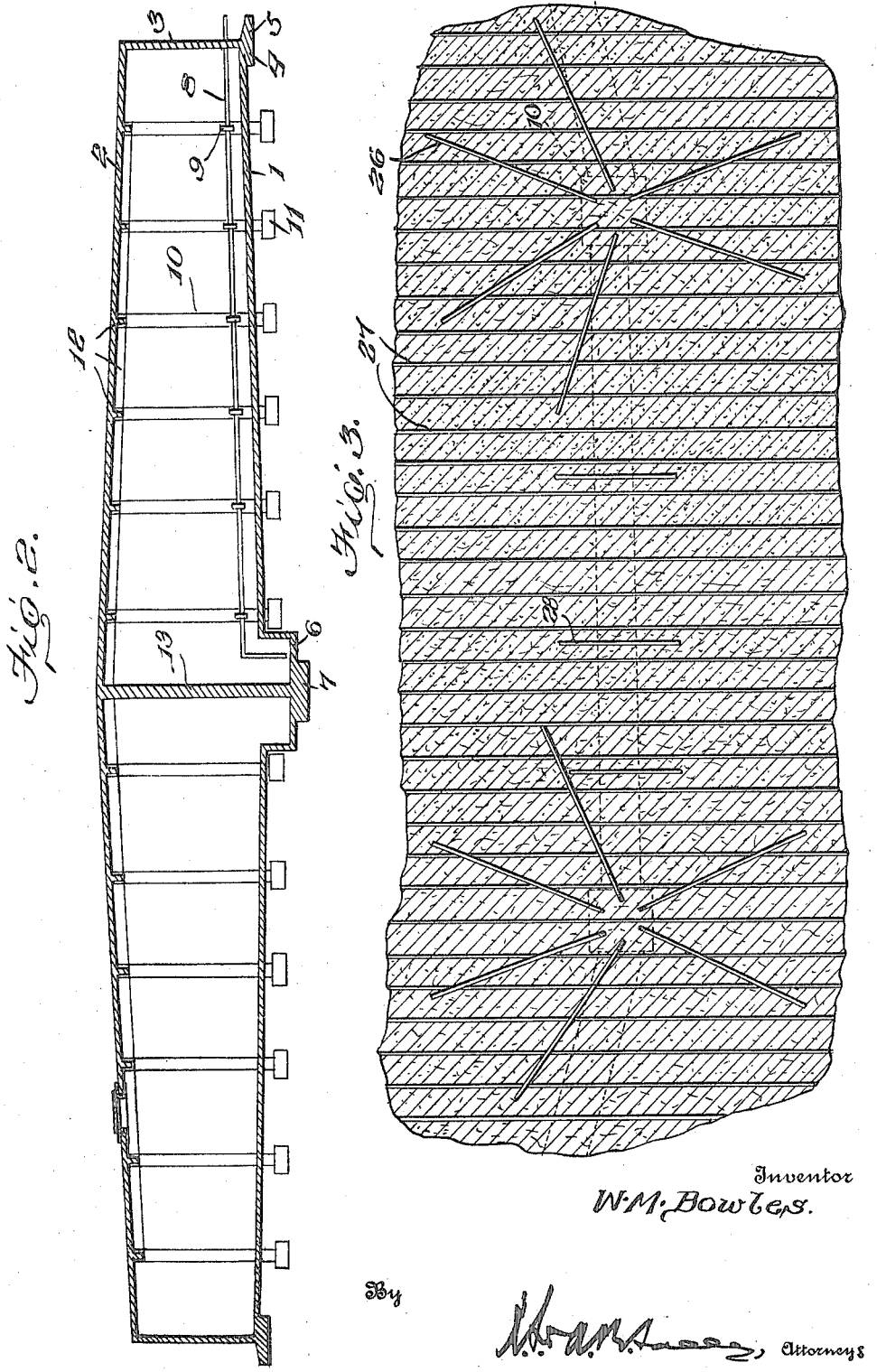

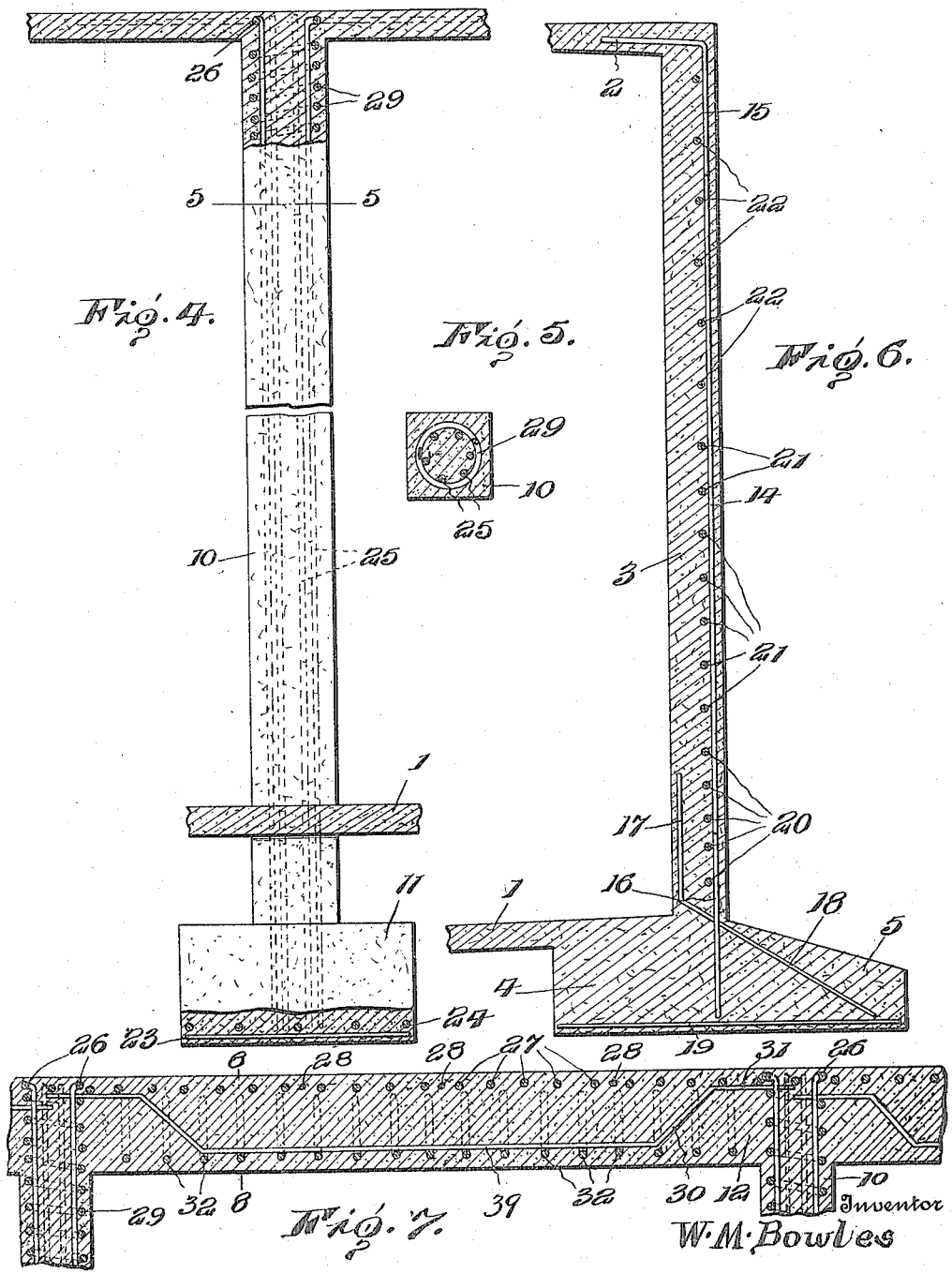

UNITED STATES PATENT OFFICE.

WILLIAM M. BOWLES, OF SAPULPA, OKLAHOMA.

OIL-STORAGE TANK.

1,264,149.　　　　　Specification of Letters Patent.　　Patented Apr. 30, 1918.

Application filed November 21, 1916. Serial No. 132,670.

*To all whom it may concern:*

Be it known that I, WILLIAM M. BOWLES, a citizen of the United States, residing at Sapulpa, in the county of Creek and State of Oklahoma, have invented certain new and useful Improvements in Oil-Storage Tanks, of which the following is a specification.

This invention relates to crude oil storage tanks and more particularly to that type which are built *in situ* from plastic material such as concrete and it is one aim of the present invention to disclose a construction of tank which will be substantial and, therefore, not liable to collapse and in this respect the invention aims to provide the walls and roof of the tank with reinforcing rods arranged therein in a novel manner and to also provide the supporting columns for the roof with reinforcements embedded in the columns and extending beyond the upper ends of the columns and in different directions radially with respect to the said upper ends of the columns and embedded at their said portions in the said roof.

Another aim of the invention is to provide a novel arrangement of reinforcing members at the juncture of the lower portions of the walls of the tank with the base or floor of the tank.

In the accompanying drawings:

Fig. 2 is a vertical transverse sectional view through the tank.

Fig. 3 is a horizontal sectional view through a portion of the roof of the tank.

Fig. 4 is a view partly in elevation and partly in section of one of the columns.

Fig. 5 is a horizontal sectional view on the line 5—5 of Fig. 4.

Fig. 6 is a vertical sectional view through the tank at one side thereof.

Fig. 7 is a detail vertical sectional view through a portion of the roof of the tank.

Figure 1:
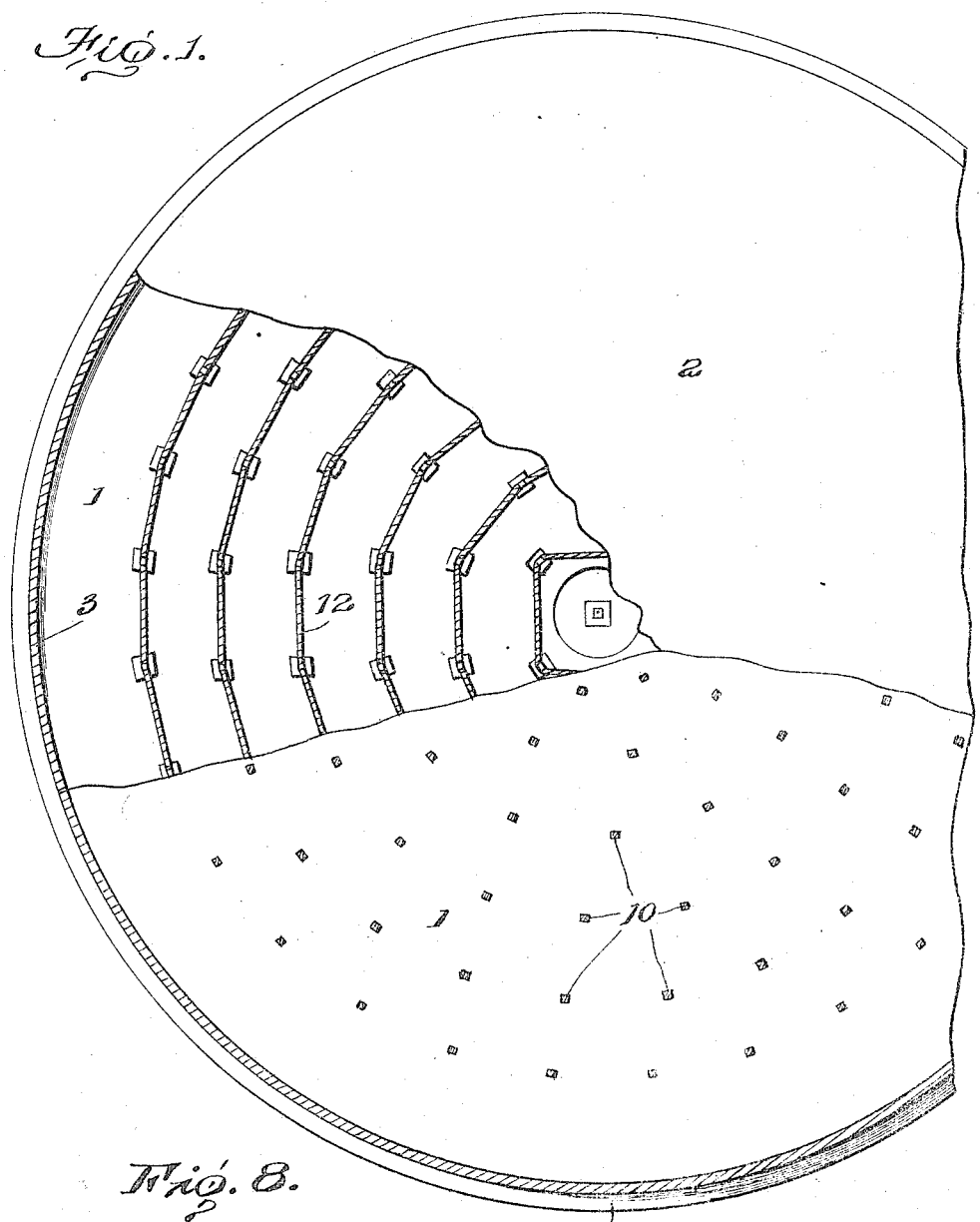
Figure 1 is a plan view of a portion of the tank embodying the present invention, parts being shown broken away and parts being shown in section.

In the drawings the floor of the tank is indicated in general by the numeral 1, the roof by the numeral 2 and the side wall by the numeral 3, the tank being preferably cylindrical in form, as shown in Fig. 1 of the drawings, although it may be rectangular or of any other desired shape and the said floor, roof and side wall are all molded integral in constructing the tank. The floor 1 and lower portion of the said wall 3 are reinforced by an integral concrete curb 4 which extends continuously around the margin of the said floor and is preferably of greater thickness than the floor proper and projects beyond the outer surface of the wall 3 as indicated at 5. The floor 1 is provided centrally with a sump 6 the bottom of which is preferably centrally reinforced by being thickened, as indicated at 7 and the said floor is preferably inclined downwardly from all points toward the said sump so that water and sediment and all other foreign matter in the oil contained in the tank may be caused to collect at a central point or, in other words, within the said sump 6, from which it may be removed through a pipe 8 which is supported in suitable brackets 9 upon the supporting columns or pillars for the roof of the tank and has its intake end extending down into the said sump and its outlet end extending through any suitable point in the area of the wall 3. The supporting pillars or columns referred to above are indicated by the numeral 10 and may be arranged in the manner shown in Fig. 1 of the drawings or more specifically in a plurality of concentric annular series or in any other manner found desirable and these columns are also of concrete and are molded integral with the roof and floor of the tank and at their ends extend below the said floor and are provided with footings 11 which form solid foundations for the said columns, it being understood that the columns in turn serve to brace and support the floor and roof of the tank. By reference to Figs. 2, 4 and 7 of the drawings, it will be observed that the columns terminate at their upper ends at the under side of the roof 2 of the tank and in order that additional bracing and supporting means may be provided for the said roof, the roof is provided upon its under side with a number of girders 12 which are molded integral therewith and which are arranged in substantially annular series, the girders of each series extending between the columns of a series.

By reference to Fig. 1 of the drawings, it will be observed that while the girders are arranged as stated in substantially annular series, nevertheless, these girders are disposed to extend along lines which are chords of the circles described by the several series of columns. The roof is preferably of shallow conical form, or, in other words, is higher at its center than at its outer edge and is inclined downwardly in all directions from its said center, the center or apex of the roof being braced by a central column 13, supported at its lower end upon the reinforcing portions 7 of the floor of the sump 6

In order that the side wall 3 of the tank may be reinforced throughout its entire area and prevented both against collapse and against outward bulging due to pressure of the oil within the tank, reinforcing rods 14 and 15 are embedded in said wall and the rods 14 are preferably shorter than the rods 15 and the rods are alternately arranged at suitable intervals in an annular series extending entirely around the wall. The upper and lower ends of the rods 14 preferably terminate short of the upper and lower edges of the side wall 3 whereas the upper ends of the rods 15 extend up into the margin of the roof 2 of the tank and their lower ends extend downwardly into the curb 4. Therefore, the upper and lower ends of the rods 15 serve the further purpose of reinforcing the tank at the juncture of the upper edge of the wall 3 with the roof 2 thereof and at the juncture of the lower edge of the wall with the said curb 4. In order to further reinforce the tank at the juncture of the wall 3 with the floor and curb 4, reinforcing members are embedded in the tank at this point and are arranged in an annular series about the tank and each of these members is formed from a rod of suitable length bent as at 16 to provide a vertically extending portion 17 embedded in the lower portion of the wall 3 and a downwardly and outwardly inclined portion 18 embedded in the lower portion of the said wall and in the portion 5 of the curb 4. These reinforcing members are so positioned within the wall 3 and curb 4 that the portions 18 of the said members will extend between the lower end portions of the reinforcing rods 15 in the manner clearly shown in Fig. 6 of the drawings. In order to further reinforce the curb 4 and its portion 5, a number of reinforcing rods 19 are embedded therein and are arranged in an annular series about the said curb, these rods being located preferably near the under side of the curb and below the lower ends of the reinforcing rods 15 and the lower ends of the portions 18 of the last described reinforcing members.

As an additional means for bracing the side wall 3 against collapse and also against outward bulging, reinforcing rods 20, 21 and 22 are embedded in the said wall and extend circumferentially of the wall and by reference to Fig. 6 of the drawings it will be observed that the rods 20 are arranged in a vertical series in the lower portion of the wall 3, the rods 21 in a vertical series in the mid-portion of the said wall, and the rods 22 in a vertical series in the upper portion of the wall. It will further be observed that the rods of each series are equidistantly spaced and that the rods 22 are spaced apart a greater distance than the rods 21, and that the rods 21 are in turn spaced apart a greater distance than the rods 20, so that the lower portion of the wall or, in other words, that portion which is subjected to the greatest strain, is more strongly reinforced than the upper portion of the wall. It will also be observed by reference to Fig. 6 of the drawings that the rods 20, 21 and 22 extend circumferentially of the wall inwardly of the rods 14 and 15.

By reference to Fig. 4 of the drawings it will be observed that the footing 11 of each supporting column 10 is reinforced by two series of reinforcing rods 23 and 24, the series of rods 23 extending beneath the rods 24 and both series being embedded in the said footing near the bottom thereof, the rods of the two series being, furthermore, arranged at right angles with relation to each other. The columns themselves are reinforced in part by reinforcing rods 25 which are embedded therein and extend vertically and may be of any desired number and these rods are preferably arranged in a circular series as shown in Fig. 5 of the drawings and equidistantly spaced. At their lower ends the rods extend downwardly into the footing 11 of the respective column and at their upper ends extend above the upper end of the respective column and into the roof 2 of the tank, as indicated by the numeral 26, their said portions 26 extending radially with relation to the vertical axis of the column, as clearly shown in Fig. 3 of the drawings. These portions 26, it will be understood, serve to reinforce the roof 2 at the point at which it is supported by each of the columns 10 and at which points it is essential that the roof possess great strength. The roof is additionally reinforced by a plurality of reinforcing rods 27 which are embedded therein and extend radially with relation to the center or apex of the roof and diverging with relation to each other in the direction of the margin of the roof. At suitable intervals relatively short reinforcing rods 28 are embedded in the roof and extend between the rods 27 and in series above the girders 12, thereby reinforcing the roof immediately above the said girders and between the upper ends of the columns 10. In order to further reinforce the columns 10 a spiral reinforcing rod 29 is embedded within each of the said columns and surrounds and incloses the rods 25 in the manner clearly shown in Figs. 4 and 5 of the drawings.

Figure 8:
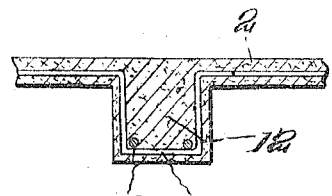
Fig. 8 is a vertical sectional view on the line 8—8 of Fig. 7.

In order to reinforce the girders 12, reinforcing rods 39 are embedded in the said girders and have their end portions extending upwardly at an angle as at 30 and thence horizontally as at 31, the portions 31 extending above the upper ends of the columns 10. Reinforcing stirrups 32 are also embedded in the girders 12 and extend transversely with relation to the reinforcing rods 39, as clearly shown in Fig. 8 of the drawings.

Having thus described the invention, what is claimed as new is:

1. A storage tank of the class described including a floor, a roof, and a side wall, supporting columns between the floor and roof, the floor being provided centrally with a sump having a centrally reinforced floor, a central supporting column integral with and supported at its lower end upon the reinforced central portion of the sump floor and at its upper end integral with and supporting the central portion of the roof, and means supported by the columns for draining the sump.

2. A storage tank of the class described including a floor, roof, and side wall, the floor and side wall at their juncture being provided with a curb extending around the tank and having a portion projecting outwardly beyond the side wall, reinforcing rods having vertical portions embedded in the inner portion of the side wall and havng downwardly and outwardly extending portions embedded in the outwardly projecting portion of the curb, and reinforcing rods embedded vertically in the outer portion of the side wall and extending vertically downward in the curb and embedded therein alternating with the downwardly and outwardly extending portions of the first-mentioned reinforcing rods.

In testimony whereof I affix my signature.

WILLIAM M. BOWLES. [L. S.]

Copies of this patent may be obtained for five cents each, by addressing the "Commissioner of Patents, Washington, D. C."